United States Patent [19]

Lund et al.

[11] 4,241,133

[45] Dec. 23, 1980

[54] STRUCTURAL MEMBERS OF COMPOSITE WOOD MATERIAL AND PROCESS FOR MAKING SAME

[75] Inventors: Anders E. Lund, Houghton; Gordon P. Krueger, Hancock; Darrell D. Nicholas; Roy D. Adams, both of Houghton, all of Mich.

[73] Assignee: Board of Control of Michigan Technological University, Houghton, Mich.

[21] Appl. No.: 26,095

[22] Filed: Apr. 2, 1979

[51] Int. Cl.$^{3}$ .................... B32B 9/04

[52] U.S. Cl. .................... 428/326; 156/62.2; 428/425.1; 428/528; 428/529; 428/537

[58] Field of Search .................... 428/2, 423, 425, 326, 428/528, 529, 537, 425.1; 156/62.2, 283, 284, 296

[56] References Cited

U.S. PATENT DOCUMENTS

| | | | |
|---|---|---|---|
| 4,061,819 | 12/1977 | Barnes | 428/528 |
| 4,091,153 | 5/1978 | Holman | 428/537 |
| 4,105,159 | 8/1978 | Brown | 428/528 |
| 4,122,236 | 10/1978 | Holman | 428/537 |

*Primary Examiner*—Marion McCamish

[57] ABSTRACT

Structural members having strength properties comparable or superior to those of solid wood are made from a composite wood material comprised of elongated wood flakes bonded together with a binder. The grain direction of the flakes extend generally parallel to their longitudinal axis and the flakes are oriented so that the longitudinal axis of at least a majority is generally parallel to the longitudinal axis of the structural member. The structural member is formed as a solid one-piece unit or assembled from two or more structural components which are made from the composite wood material and are joined together in angular relationship with an adhesive.

17 Claims, 4 Drawing Figures

STRUCTURAL MEMBERS OF COMPOSITE WOOD MATERIAL AND PROCESS FOR MAKING SAME

FIELD OF THE INVENTION

This invention relates to structural members made from a composite wood material comprised of wood flakes bonded together with a binder.

Various types of structural members, such as utility poles, guard rail, fence and sign posts, building beams, construction pilings, railroad ties and the like, are commonly made from solid wood. Because of such factors as increasing production costs, limited supply of trees of suitable species and/or size, and more economically efficient use for other purposes, there is a growing need for a substitute material from which the above and other types of structural members can be made. The use of wood residues and surplus woods of low commercial value for this purpose is quite desirable because of the vast supply and the lower, more stable cost. In order to be capable of being used for the same applications, the resulting structural member should have properties, particularly strength properties, which meet or exceed those of solid wood.

BACKGROUND PRIOR ART

It is known to manufacturer flat particle board from comminuted wood by mixing the wood particles with a suitable binder, such as a synthetic thermosetting resin, forming the mixture into a mat, and then compressing the mat between heated platens to set the binder and bond the wood particles together in a densified form. This type process is exemplified in U.S. Pat. Nos. 3,164,511 (Elmendorf) 3,391,233 (Polovtseff) and 3,940,230 (Potter).

In this type process, the wood particles are deposited so they are either randomly oriented relative to each other or oriented to cross each other. For example, the Elmendorf U.S. Pat. No. 3,164,511 discloses orienting the wood particles or strands so that substantially all cross at least one other strand at an average acute angle of less than about 40 degrees. Products having strength properties which are acceptable for typical applications of flat particle board can be produced from processes wherein the wood particles are randomly oriented or oriented in the manner disclosed in the Elmendorf patent. However, structural members of 1-inch thickness or more produced by such processes generally have strength properties, particularly bending strengths along the longitudinal axis, which are somewhat inferior to solid wood.

BRIEF SUMMARY OF THE INVENTION

A principal object of the invention is to provide a method for making structual members, having strength properties comparable or superior to solid wood, from wood particles derived from low cost woods.

Another object of the invention is to provide high strength structural members made from a composite wood material composed of elongated wood flakes bonded together with a binder.

A further object of the invention is to provide a method for making structural members including two or more elongated structural components, each of which is formed from a composite wood material.

A still further object of the invention is to provide elongated structural members including two or more elongated structural components made from such a composite wood material and joined together in angular relationship.

Other objects, aspects and advantages of the invention will become apparent to those skilled in the art upon reviewing the following detailed description, the drawing and the appended claims.

It has been found that structural members formed from a composite wood material and having a strength which is equal to or stronger than Douglas fir or southern pine can be produced from a variety of species by employing elongated wood flakes having a grain direction extending generally parallel to their longitudinal axis and orienting the flakes so that the longitudinal axis of at least a majority is generally parallel to a predetermined axis of the structural member.

In a preferred method for making an elongated structural member, such as a building beam, a guard rail post or the like, wood flakes having an average length of about 0.5 inch to about 3.5 inches, an average length to average width ratio of about 4:1 to about 10:1 and an average thickness of about 0.01 to about 0.05 inch are used. A suitable binder, such as a resinous particle board binder is admixed with the wood flakes and the resulting mixture or furnish is formed into a loosely felted melt with at least a majority, preferably about 90% or more, of the wood flakes oriented such that their longitudinal axis is generally parallel to the longitudinal axis of the structural member to be formed from the mat. Sufficient pressure is applied on the mat, such as with platens (either heated or at room temperature), to compress the mat to the desired thickness of the structural member and to bond the wood flakes together. The resultant structural member usually has a density of about 38 to about 50, preferably about 42 to about 45, lbs/ft$^3$.

The resulting structural member preferably contains about 5 to 12 weight % of the binder and, optionally, additives, such as wax, for waterproofing and preservatives for protection against decay fungi and insects. Organic polyisocyanates are the preferred binder because of the higher strength properties provided thereby.

In one embodiment, separate elongated structural components are formed and two or more are joined together in angular relationship with a suitable adhesive to form an elongated structural member having an I-beam, angle bar, channel bar, etc. configuration.

DESCRIPTION OF THE PREFERRED EMBODIMENTS

Figure 1:
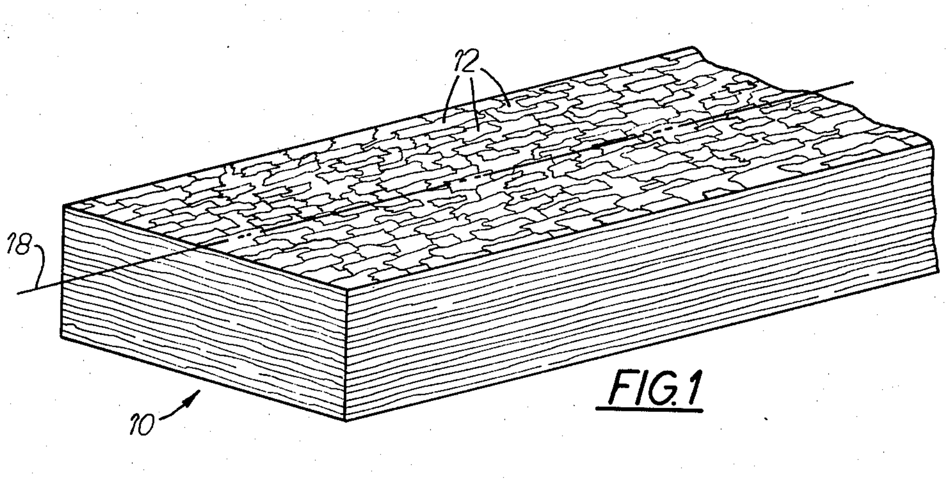
FIG. 1 is a fragmentary, perspective view of a solid, one-piece structural member made in accordance with the invention.
Figure 4:
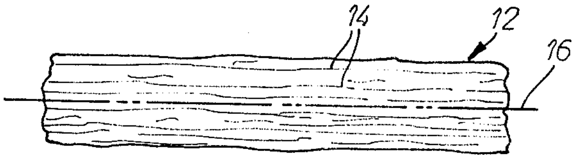
FIG. 4 is an enlarged, top plan view of an exemplary wood flake used for making structural members in accordance with the invention.

Illustrated in FIG. 1 is an elongated structural member 10 made from a composite wood material in accordance with the invention and having a cross-sectional dimension corresponding to a standard lumber 2×4. The structural member 10 is molded or pressed as a solid one-piece unit from a mixture of wood flakes 12 and a suitable board binder as described in more detail below. As shown in FIG. 4, the wood flakes 12 (illustrated at about 2 times normal size) are elongated and have a grain direction (designated by reference numeral 14) extending generally parallel to the longitudinal axis 16 thereof. As shown in FIG. 1, at least a majority of the wood flakes 12 making up the structural member 10 is oriented so that the planes thereof are coextensive or generally parallel to each other and their longitudinal axis 16 is generally parallel to the longitudinal axis 18 of the structural member 10. In other words, the grain direction of the thus-oriented wood flakes extends generally parallel to the longitudinal axis 18 of the structural member 10 in a manner similar to a 2×4 of natural wood.

Figure 2:
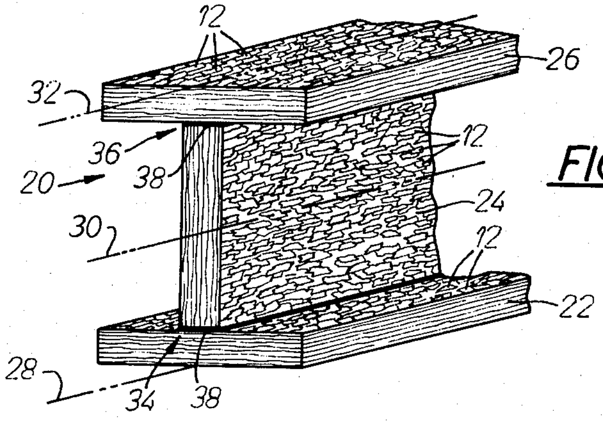
FIG. 2 is a fragmentary perspective view of a three-piece structural member, having an I-beam configuration, made in accordance with the invention.
Figure 3:
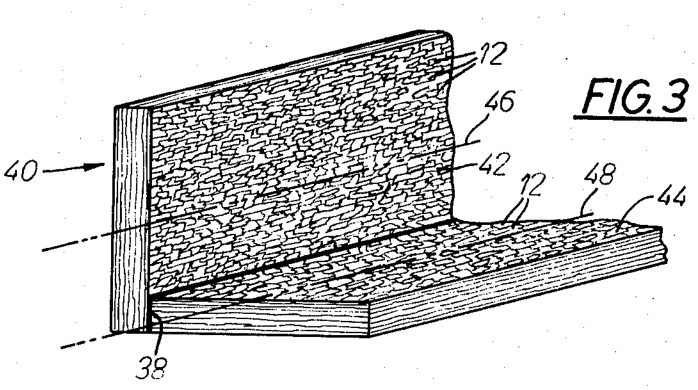
FIG. 3 is a fragmentary perspective view of a two-piece structural member, having an angle bar configuration, made in accordance with the invention.

FIGS. 2 and 3 fragmentarily illustrate multi-piece structural members 20 and 40 made from a composite wood material in accordance with the invention.

The structural member 20 illustrated in FIG. 2 has an I-beam configuration and includes separate elongated, generally flat, structural components 22, 24 and 26. Each of the structural components 22, 24 and 26 is molded from a mixture of wood flakes 12 and a binder in the same general manner outlined above. That is, at least a majority of the wood flakes 12 making up each of the structural components is oriented so that their planes are coextensive or generally parallel to each other and their longitudinal axis 16 is generally parallel to the longitudinal axis 28, 30 and 32 of the respective structural components 22, 24 and 26. The opposite longitudinal edges 34 and 36 of the intermediate component 24 are bonded to components 22 and 26 by a suitable high strength adhesive 38, such as resorcinol or isocyanate type adhesive or other adhesives suitable for bonding wood products.

The structural member 40 illustrated in FIG. 3 has an angle bar configuration and includes separate elongated, generally flat, structural components 42 and 44 which are molded from a wood flakes-binder mixture and bonded together with an adhesive as described above in connection with the I-beam structural member 30. As with the components for the I-beam construction, at least a majority of the wood flakes 12 making up the structural components 42 and 44 is oriented so that their planes are coextensive or generally parallel to each other and their longitudinal axis 16 is generally parallel to the longitudinal axis 46 and 48 of the structural components 42 and 44.

The process of the invention will now be described in more detail. The process broadly includes the steps of comminuting small logs, branches or rough pulp wood into flake-like particles, drying the wood flakes to a predetermined moisture content, classifying the dried flakes to a predetermined size, blending predetermined quantities of a suitable binder, and optionally a liquid wax composition, preservatives and other additives with the dried and sized flakes, forming the resultant mixture or furnish into a loosely felted, layered mat (single or multi-layered) and applying sufficient pressure (with or without heat) on the mat to compress it to the desired thickness for the structural member or components therefor and to bond the wood flakes together.

Wood flakes used can be prepared from various species of suitable hardwoods and softwoods. Representative examples of suitable woods include aspen, maple, elm, balsam fir, pine, cedar, spruce, locust, beech, birch, Douglas fir and mixtures thereof.

Wood exhibits directional strength properties with the strength along the grain being far greater than across the grain. In order to maximize strength of the resulting structural member, the wood flakes are prepared so that the grain direction is generally parallel to the major longitudinal axis thereof and the flakes are oriented or aligned during mat formation so that their planes are coextensive or generally parallel to each other and at least a majority, preferably 90% or more, have their grain direction aligned with a predetermined axis of the structural member. For elongated structural members used for applications where a high loading strength along the longitudinal axis is required, such as the structural members 10, 20 and 40 illustrated in FIGS. 1–3, the grain direction of the flakes is aligned with the longitudinal axis of the structural members.

The wood flakes can be prepared by various conventional techniques. For example, pulpwood grade logs or so-called roundwood, can be converted into flakes in one operation with a conventional roundwood flaker. Alternatively, logs, logging residue with a total tree can be cut into fingerlings in the order of 0.5 to 3.5 inches long with a conventional device, such as the helical comminuting shear disclosed in U.S. Pat. No. 4,053,004, and the fingerlings flaked in a conventional ring-type flaker. The woods preferably are debarked prior to flaking.

Roundwood flakes generally are preferred because the lengths and thickness can be more accurately controlled and the width and shape are more uniform. Also, roundwood flakes tend to be somewhat flatter which facilitates their alignment during mat formation. Roundwood flakers generally produce lesser amounts of undesirable fines.

For best results, wood flakes should have an average length of about 0.5 inch to about 3.5 inches, preferably about 1 inch to about 2 inches, and an average thickness of about 0.01 to about 0.05, preferably about 0.015 to about 0.025 inch and most preferably about 0.02 inch. Flakes longer than about 3.5 inches tend to curl which hinders proper alignment during mat formation and it is difficult to insure that flakes shorter than about 0.5 inch do not become aligned with their grain direction crosswise. Flakes thinner than about 0.01 inch tend to require excessive amounts of binder to obtain adequate bonding and flakes thicker than about 0.05 inch are relatively stiff and tend to require excessive compression to obtain the desired intimate contact therebetween. In any given batch, some of the flakes can be shorter than 0.5 inch and some can be longer than 3.5 inches so long as the overall average length is within the above range. The same is true for the thickness.

To facilitate proper alignment, the flakes should have a length which is several times the width, preferably about 4 to about 10 times. Using this constraint as a guide, the average width of the flakes generally should be about 0.1 to about 0.5 inch.

While the flake size can be controlled to a large degree during the flaking operation, it is usually necessary to use some classification in order to remove undesired particles, both undersized and oversized, and thereby insure the average length, thickness and width of the flakes are within the desired ranges.

Flakes from some green woods can contain up to 90% moisture. The moisture content of the mat must be substantially less for the pressing operation. Also, wood flakes tend to stick together and complicate classification and handling prior to blending. Accordingly, the flakes preferably are dried prior to classification in a conventional dryer to the moisture content desired for the blending step. The moisture content to which the flakes are dried depends primarily on a particular binder used and usually is in the order of about 3 to about 20 weight % or less, based on the dry weight of the flakes. If desired, the flakes can be partially dried prior to classification and then dried to the desired moisture content for blending after classification. This two-step drying can reduce overall energy requirements for drying flakes prepared from green woods when substantial quantities of improperly sized flakes must be removed during classification and, thus, need not be as thoroughly dried.

A known amount of the dried, classified flakes is introduced into a conventional blender wherein predetermined amounts of a binder, and optionally a wax, a preservative and other additives, is applied to the flakes as they are tumbled or agitated in the blender. Suitable binders include those used in the manufacture of particle board and similar pressed fibrous products and other chemical bonding systems. Resinous particle board binders presently are preferred. Representative examples of suitable binders include thermosetting resins such as phenol-formaldehyde, resorcinolformaldehyde, melamine-formaldehyde, urea-formaldehyde, urea-furfural and condensed furfuryl alcohol resins, and organic polyisocyanates including those curable at room temperatures, either alone or combined with urea or melamine-formaldehyde resins. Particularly suitable polyisocyanates are those containing at least two active isocyanate groups per molecule, including diphenylmethane diisocyanates, m- and p-phenylene diisocyanates, chlorophenylene diisocyanates, toluene di- and triisocyanates, triphenylmethane triisocyanates, diphenyl ether-2,4,4′-triisocyanate, polyphenolpolyisocyanates, particularly diphenyl-methane-4,4′-diisocyanate.

The particular type binder used depends primarily upon the intended use for the structural member. For instance, structural members made with urea-formaldehyde resins have sufficient moisture durability for many uses which involve minimal exposure to moisture, but generally cannot withstand extended outdoor exposure. Phenol-formaldehyde and melamine-formaldehyde resins provide the structural member with durable properties required for long-term exterior applications. Polyisocyanates, even in lesser amounts, provide greater strengths and resistant to weathering which is comparable to phenol-formaldehyde and melamine-formaldehyde resins. Polyisocyanates can be cured in about the same or less time as urea-formaldehyde resins. However, polyisocyanates are more expensive and may require the use of a mold release agent because of their tendency to stick to metal parts. These factors are balanced against each other when selecting a specific binder to be used.

The amount of binder added to the flakes during the blending step depends primarily upon the specific binder used, size, moisture content and type of wood flakes, and the desired properties of the resulting structural member. Generally, the amount of binder added to the flakes is about 5 to about 12 weight %, preferably about 6 to about 10 weight %, as solids based on the dry weight of the flakes.

The binder can be admixed with the flakes in either dry or liquid form. To maximize coverage of the flakes, the binder preferably is applied by spraying droplets of the binder in liquid form onto the flakes as they are being tumbled or agitated in the blender. Moisture resistance of the structural member can be improved by spraying a liquid wax emulsion onto the flakes during the blending step. The amount of wax added generally is about 0.5 to about 5 weight %, as solids based on the dry weight of the flakes. When the structural member is to be used for long-term exterior applications, a preservative for protecting the wood against attacks by decay fungi and insects is added to the wood flakes during or before the blending step. Any preservative which is compatible with the adhesive system be used. Typical for examples, include pentachlorophenol, creosote, chromated copper arsenate, ammonical copper arsenate and the like. It has been found that effective amounts of such preservatives, up to about 5 weight %, can be added to the wood flakes without producing an appreciable reduction in the structural strength of the resulting structural member, i.e., the loss in strength is about the same as solid wood treated with the same preservatives. Other additives, such as coloring agents, fire retardants and the like may also be added to the flakes during or before the blending step. The binder, wax and other additives can be added separately or in any sequence or in combined form.

The moistened mixture of flakes, binder, wax, preservative, etc. or furnish from the blending step is formed into a loosely-felted, single or multi-layered mat which is compressed into a solid, one-piece structural member, such as structural member 10 illustrated in FIG. 1, or components for assembly of multi-piece structural members, such as the components for structural members 20 and 40 illustrated in FIGS. 2 and 3.

Generally, the moisture content of the furnish after completion of blending, including the original moisture content of the flakes and the moisture added during blending the binder, wax and other additives, should be about 5 to about 25 weight %, preferably about 10 to about 20 weight %. Generally, higher moisture contents within these ranges can be used for polyisocyanate binders.

The furnish is formed by suitable apparatus into a generally flat, loosely-felted mat, either single or multiple layers, and the mat is placed in a suitable press wherein it is compressed to consolidate the wood flakes into a structural member of the desired size and cross-sectional shape. For example, the furnish can be deposited on a plate-like carriage carried on an endless belt or conveyor from one or more hoppers spaced above the belt in the direction of travel. When a multi-layered mat is formed, a plurality of hoppers is used with each having a dispensing or forming head extending across the width of the carriage for successively depositing a separate layer of the furnish as the carriage is moved beneath the forming heads.

In order to produce structural members having the desired strength characteristics, the mat should have a substantially uniform thickness and the flakes aligned during mat formation with the orientation discussed above. The mat thickness can be controlled primarily by appropriately metering the flow of furnish from the forming head.

The flakes can be aligned by using a laterally spaced baffling system or other suitable means located between the former heads and the carriage and arranged to guide the elongated flakes into the desired orientation as they are deposited on the carriage or previously deposited layer(s) of furnish.

The mat thickness will vary depending upon such factors as the size and shape of the wood flakes, the particular technique used in forming the mat, the desired thickness and density of the structural member or component and the pressing pressure used. The mat thickness usually is about 5 to 6 times the final thickness of the structural member or component. For example, for a structural component having a 1-inch thickness and a density of about 40 lbs./ft.$^3$, the mat usually will be about 5–6 inches thick. If the mat is thicker than about 25–30 inches, it usually must be partially pre-compressed to a reduced thickness, with rollers or the like, prior to introduction into the press.

Pressing temperatures, pressures and times, vary widely depending on the thickness and the desired density of the structural member or component, size and type of wood flakes, moisture content of the flakes and the type of binder. The pressing temperature used is sufficient to at least partially cure the binder and expel water from the mat within a reasonable time period and without charring the wood. Generally, a pressing temperature ranging from ambient (for room temperature-curable binders) up to about 450° F. can be used. Temperatures above 450° F. can cause charring of the wood flakes. A pressing temperature of about 250° to about 375° F. is generally preferred for polyisocyanate binders which does employ a catalyst and a temperature of about 350° to about 425° F. is generally preferred for phenolformaldehyde resin binders.

The pressure should be sufficient to press the wood flakes into intimate contact with each other without crushing them to the point causing a breakdown of fibers with a resultant degradation in structural integrity. The pressure usually is about 325 to about 500 psi.

The pressing time is sufficient to at least partially cure the binder to a point where the structural member or component has sufficient integrity for handling. The press cycle typically is about 2 to about 20 minutes; however, longer times can be used when pressure-curing binders are employed or when more complete curing of thermosetting binders is desired.

While solid woods of different species typically exhibit vastly different strength properties, it has been found that the strength properties of structural members made in accordance with the invention are substantially the same for a wide variety of high strength and low strength species. Thus, species heretofore not considered useful for structural products can be used without sacrificing strength properties. Also, the strength properties of the composite wood material are more uniform than solid wood because of the absence of knots or other grain inconsistencies normally present in solid woods.

From the foregoing description, one skilled in the art can easily ascertain the essential characteristics of the invention, and without departing from the spirit and scope thereof, can make various changes and modifications to adapt the invention to various usages and conditions.

We claim:

1. A method for making a structural member of a composite wood material and having an axis, said method including steps of:
(a) providing elongated wood flakes having a grain direction extending generally parallel to the longitudinal axis thereof, an average length of about 0.5 inch to about 3.5 inches, an average length to average width ratio of about 4:1 to about 10:1 and an average thickness of about 0.01 to about 0.05 inch,
(b) admixing a binder with the wood flakes,
(c) forming a layered mat of the resulting mixture with at least a majority of the wood flakes oriented such that the longitudinal axis thereof is generally parallel to the axis of the structural member to be formed from the mat, and
(d) applying sufficient pressure on the mat to bond the wood flakes together and form the structural member.

2. A method according to claim 1 wherein at least 90% of the wood flakes oriented in the recited manner.

3. A method according to claim 1 wherein the wood flakes have an average of about 1 to about 2 inches.

4. A method according to claim 1 wherein the wood flakes have an average thickness of about 0.015 to about 0.025 inch.

5. A method according to claim 1 wherein the average width of the wood flakes is about 0.1 to about 0.5 inch.

6. A method according to claim 1 wherein the amount of binder admixed with the wood flakes during step (b) is about 5 to about 12 weight %, as solids based on the dry weight of the wood flakes.

7. A method according to claim 6 wherein the binder includes an organic polyisocyanate having at least two active isocyanate groups per molecule.

8. A method for making an elongated structural member of a composite wood material and having at least two elongated, angularly related components, said method including the steps of:
(a) providing elongated wood flakes having a grain direction extending generally parallel to the longitudinal axis thereof, an average length of about 0.5 inch to about 3.5 inches, an average length to average width ratio of about 4:1 to about 10:1 and an average thickness of about 0.01 to about 0.05 inch,
(b) admixing a binder with the wood flakes,
(c) forming a layered mat of the resulting mixture for each of the components with at least a majority of the wood flakes oriented such that the longitudinal axis thereof is generally parallel to the longitudinal axis of the component to be formed from the mat,
(d) applying sufficient pressure on the mats to bond the wood flakes together and form the respective component, and
(e) bonding the components together to form the structural member.

9. A structural member made from a composite wood material and having an axis comprising:
elongated wood flakes bonded together with a binder, said wood flakes having a grain direction extending generally parallel to the longitudinal axis thereof, an average length of about 0.5 inch to about 3.5 inches, an average length to average width ratio of about 4:1 to about 10:1, an average thickness of about 0.01 to about 0.05 inch and at least a majority being oriented such that the longitudinal axis is generally parallel to the axis of said structural member.

10. A structural member according to claim 9 wherein at least 90% of the wood flakes are oriented in the recited manner.

11. A structural member according to claim 9 wherein the wood flakes have an average length of about 1 inches to about 2 inches.

12. A structural member according to claim 9 wherein the wood flakes have an average thickness of about 0.015 to about 0.025 inch.

13. A structural member according to claim 9 wherein the average width of the wood flakes is about 0.1 to about 0.5 inch.

14. A structural member according to claim 9 containing about 5 to about 12 weight % of binder, as solids based on the dry weight of the wood flakes.

15. A structural member according to claim 14 wherein the binder includes an organic polyisocyanate having at least two active isocyanate groups per molecule.

16. An elongated structural member of a composite wood material including at least two elongated structural components bonded together in angular relationship, each of said structural components being comprised of:

elongated wood flakes bonded together with a binder, said wood flakes having a grain direction extending generally parallel to the longitudinal axis thereof, an average length of about 0.5 inch to about 3.5 inches, and average length to average width ratio of about 4:1 to about 10:1 and an average thickness of about 0.01 to about 0.05 inch and at least a majority being oriented such that the longitudinal axis is generally parallel to the longitudinal axis of said structural component.

17. A structural member according to claim 16 wherein at least 90% of the wood flakes are oriented in the recited manner.

* * * * *

UNITED STATES PATENT AND TRADEMARK OFFICE
CERTIFICATE OF CORRECTION

PATENT NO. : 4,241,133

DATED : December 23, 1980

INVENTOR(S) : Anders E. Lund, Gordon P. Krueger
Darrell D. Nicholas and Roy D. Admas It is certified that error appears in the above-identified patent and that said Letters Patent are hereby corrected as shown below:

Column 8, line 17, after "average", the word --length-- should be inserted.

Signed and Sealed this

*Fifth* Day of *May 1981*

[SEAL]

*Attest:*

RENE D. TEGTMEYER

*Attesting Officer* *Acting Commissioner of Patents and Trademarks*